(12) United States Patent
Chae

(10) Patent No.: US 11,470,613 B2
(45) Date of Patent: Oct. 11, 2022

(54) METHOD FOR TRANSMITTING OR RECEIVING SIDELINK SIGNAL BY TERMINAL IN WIRELESS COMMUNICATION SYSTEM SUPPORTING SIDELINK AND APPARATUS THEREFOR

(71) Applicant: LG ELECTRONICS INC., Seoul (KR)

(72) Inventor: Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/979,326

(22) PCT Filed: Mar. 29, 2019

(86) PCT No.: PCT/KR2019/003726
§ 371 (c)(1),
(2) Date: Sep. 9, 2020

(87) PCT Pub. No.: WO2019/190273
PCT Pub. Date: Mar. 10, 2019

(65) Prior Publication Data
US 2021/0007103 A1  Jan. 7, 2021

(30) Foreign Application Priority Data

Mar. 30, 2018 (KR) .......................... 10-2018-0036928

(51) Int. Cl.
*H04W 72/04* (2009.01)
*H04L 5/00* (2006.01)
*H04L 27/26* (2006.01)

(52) U.S. Cl.
CPC ....... *H04W 72/0466* (2013.01); *H04L 5/0048* (2013.01); *H04L 27/2614* (2013.01)

(58) Field of Classification Search
None
See application file for complete search history.

(56) References Cited

U.S. PATENT DOCUMENTS

2017/0038775 A1\*  2/2017  Park ....................... B60W 10/06
2018/0376525 A1\* 12/2018  Feng ................... H04L 27/0014
(Continued)

FOREIGN PATENT DOCUMENTS

WO       2017/048064 A1       3/2017
WO    WO-2017048064 A1 \*    3/2017   ........... H04L 5/0051
(Continued)

OTHER PUBLICATIONS

Intel Corporation, "Short PUCCH formats for 1~2 UCI bits", Apr. 3-7, 2017, 3GPP TSG RAN WG1 Meeting #88b, pp. 1-3 (Year: 2017).\*

(Continued)

*Primary Examiner* — Steve R Young
(74) *Attorney, Agent, or Firm* — Dentons US LLP

(57) ABSTRACT

Disclosed according to various embodiments are a method for transmitting a sidelink signal by a terminal in a wireless communication system supporting a sidelink and an apparatus therefor. The method for transmitting a sidelink signal comprises the steps of: applying scramble codes to data symbols and a DMRS; performing frequency-division multiplexing (FDM) of the data symbols and the DMRS; and transmitting a sidelink signal including the frequency division multiplexed (FDM) data symbols and DMRS, wherein the transmitted sidelink signal is a single sidelink signal selected from a plurality of sidelink signals which are generated by applying the plurality of scramble codes to the data symbols and the DMRS, respectively.

13 Claims, 22 Drawing Sheets

(56) References Cited

U.S. PATENT DOCUMENTS

2019/0165980 A1* 5/2019 Lindoff ............. H04W 72/0453
2020/0336276 A1* 10/2020 Tang ................. H04W 72/0466
2021/0092699 A1* 3/2021 Lee ....................... H04L 5/0048

FOREIGN PATENT DOCUMENTS

WO     2017/180052 A1    10/2017
WO     2018/049035 A1     3/2018

OTHER PUBLICATIONS

R1-1704750: 3GPP TSG RAN WG1 Meeting #88b, Spokane, USA, Apr. 3-7, 2017, Intel Corporation, "Short PUCCH formats for 1~2 UCI bits," (3 pages).
R1-1712266: 3GPP TSG-RAN WG1 #90, Prague, Czech Republic, Aug. 21-25, 2017, Mitsubishi Electric, "PTRS insertion methods and patterns for UL DFTs OFDM waveform," (13 pages).

* cited by examiner

FIG. 5
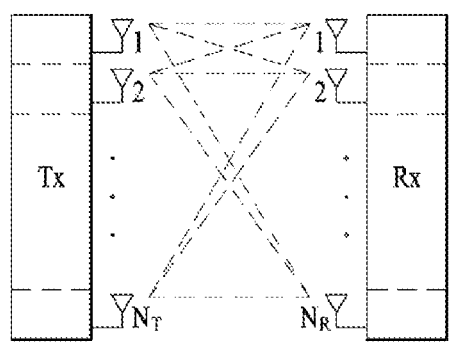
(a)
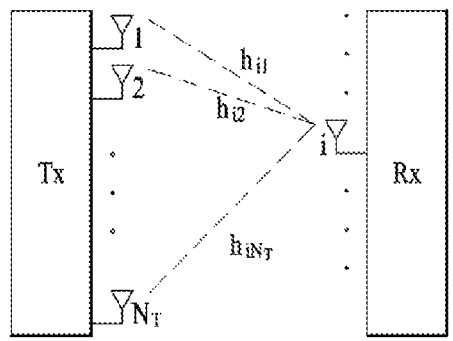
(b)

FIG. 8
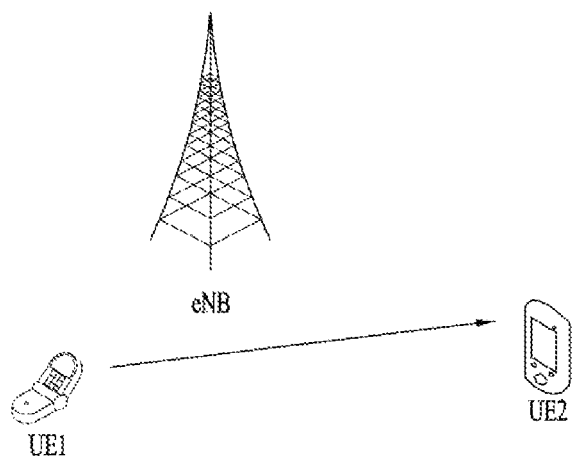
(a)
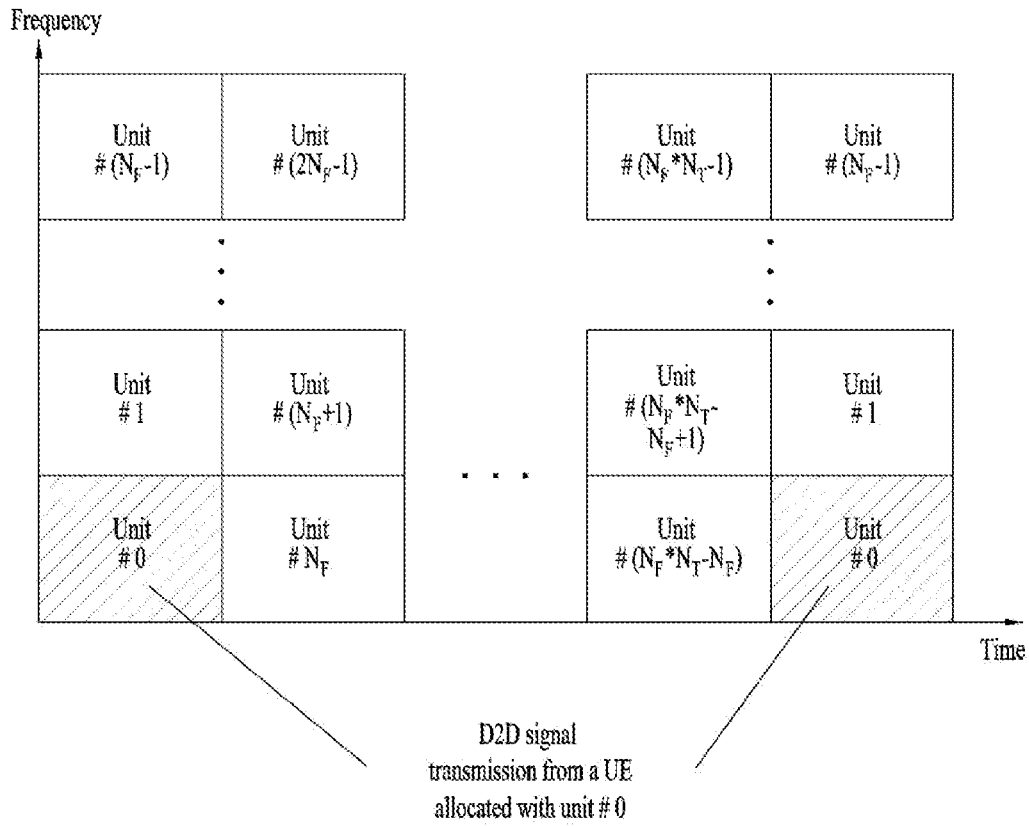
(b)

FIG. 9
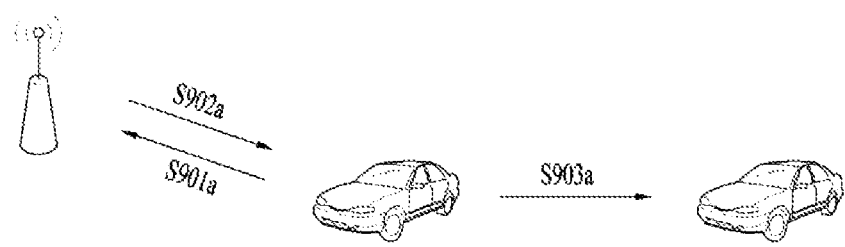
(a)
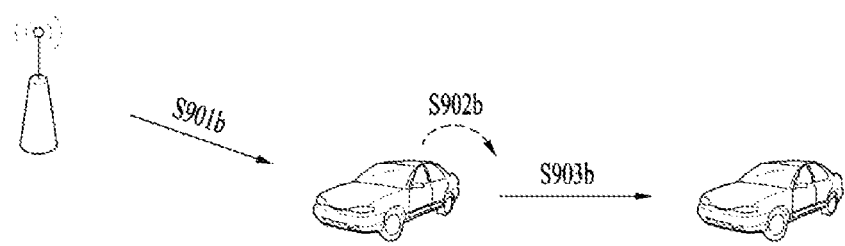
(b)

FIG. 12
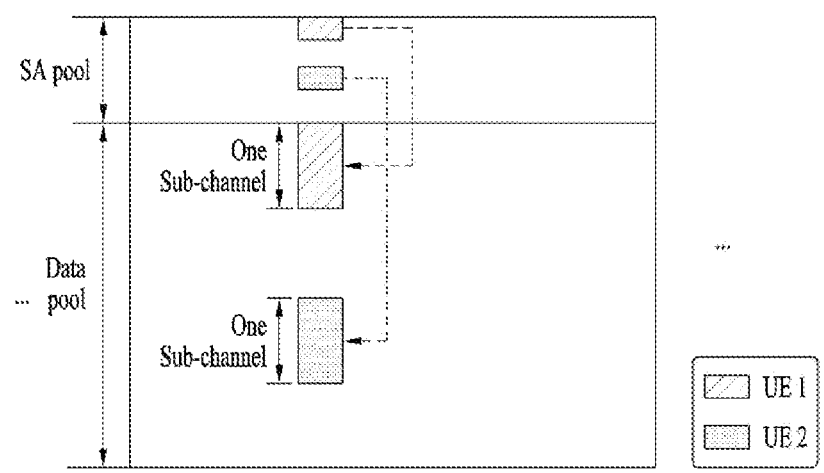
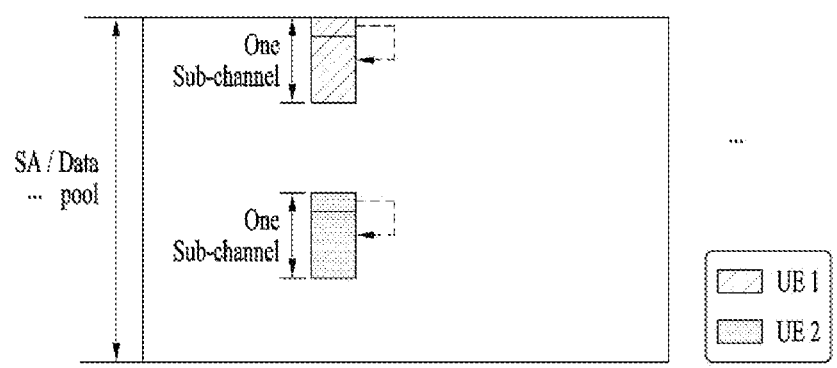

FIG. 14
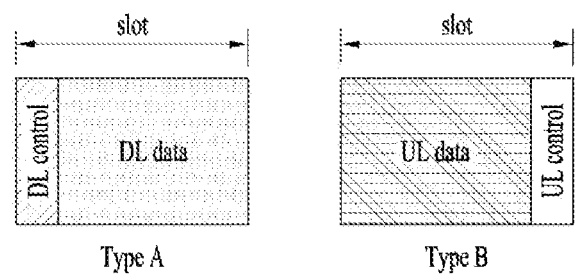
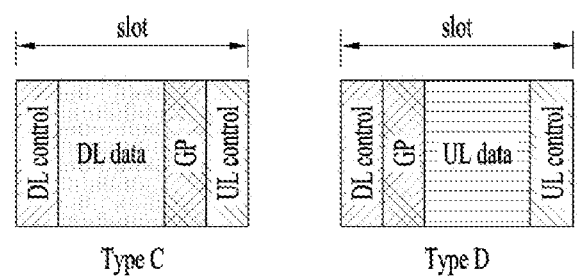

METHOD FOR TRANSMITTING OR RECEIVING SIDELINK SIGNAL BY TERMINAL IN WIRELESS COMMUNICATION SYSTEM SUPPORTING SIDELINK AND APPARATUS THEREFOR

This application is the National Stage filing under 35 U.S.C. 371 of International Application No. PCT/KR2019/003726 filed Mar. 29, 2019, which claims the benefit of Korean Application No. 10-2018-0036928 filed Mar. 30, 2018, the contents of which are all hereby incorporated by reference herein in their entirety.

TECHNICAL FIELD

The present disclosure relates to a method of transmitting and receiving by a terminal a sidelink signal in a wireless communication system supporting sidelink and apparatus therefor and, more particularly, to a method of transmitting and receiving, by a terminal, a sidelink signal where a demodulation reference signal (DMRS) is frequency-division multiplexed with a data symbol and apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi-carrier frequency division multiple access (MC-FDMA) system.

Device-to-device (D2D) communication is a communication scheme in which a direct link is established between user equipments (UEs) and the UEs exchange voice and data directly without intervention of an evolved Node B (eNB). D2D communication may cover UE-to-UE communication and peer-to-peer communication. In addition, D2D communication may be applied to machine-to-machine (M2M) communication and machine type communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

At present, vehicle-to-everything (V2X) communication in conjunction with D2D communication is under consideration. In concept, V2X communication covers vehicle-to-vehicle (V2V) communication, vehicle-to-pedestrian (V2P) communication for communication between a vehicle and a different kind of terminal, and vehicle-to-infrastructure (V2I) communication for communication between a vehicle and a roadside unit (RSU).

DISCLOSURE

Technical Problem

The object of the present disclosure is to minimize the peak-to-average power ratio/cubic metric (PAPR/CM) due to frequency-division multiplexing (FDM) of a demodulation reference signal (DMRS) and data symbols by transmitting one specific sidelink signal selected from among a plurality of sidelink signals obtained by applying a plurality of scrambling codes to the DMRS and data symbols.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided herein is a method of transmitting a sidelink signal by a user equipment (UE) in a wireless communication system supporting sidelink. The method may include applying a scrambling code to a demodulation reference signal (DMRS) and data symbols, performing frequency-division multiplexing (FDM) on the DMRS and data symbols, and transmitting a sidelink signal including the frequency-division multiplexed (FDM) DMRS and data symbols. The transmitted sidelink signal may be one sidelink signal selected from among a plurality of sidelink signals generated by applying a plurality of scrambling codes to the DMRS and data symbols.

Alternatively, the scrambling code may include a code for imposing a phase change value on the DMRS or data symbols.

Alternatively, the scrambling code may be applied for each predetermined orthogonal frequency-division multiplexing (OFDM) symbol group.

Alternatively, the size of the predetermined OFDM symbol group may be determined based on the moving speed of the UE.

Alternatively, when the moving speed of the UE is more than or equal to a prescribed speed, the predetermined OFDM symbol group may consist of one OFDM symbol.

Alternatively, when the speed of the UE is less than a prescribed threshold, the scrambling code may be applied.

Alternatively, the selected one sidelink signal may be a sidelink signal selected from the plurality of sidelink signals based on a peak-to-average power ratio (PAPR).

Alternatively, the UE may signal indication information for identifying the scrambling code through a higher layer signal or a physical layer signal.

Alternatively, when a plurality of OFDM symbols are included in a time unit for transmitting the sidelink signal, the UE may signal the indication information only for information about a scrambling code applied to a specific OFDM symbol among the plurality of OFDM symbols.

Alternatively, the specific symbol may be the first OFDM symbol among the plurality of OFDM symbols.

Alternatively, the method may further include applying discrete Fourier transform (DFT) preceding to at least one of the DMRS and data symbols.

Alternatively, when the plurality of OFDM symbols are included in the time unit for transmitting the sidelink signal, if the moving speed of the UE is more than or equal to a prescribed threshold speed, the indication information may be signaled for each OFDM symbol.

Alternatively, among a first sidelink signal obtained by applying a first scrambling code to the DMRS and data symbols and a second sidelink signal obtained by applying a second scrambling code to the DMRS and data symbols, a sidelink signal with the lowest PAPR may be selected as the sidelink signal Alternatively, whether a DFT is applied to the DMRS may be determined based on the geographical location of the UE.

Alternatively, the DMRS may be located between the data symbols in the frequency domain.

Alternatively, whether a DFT is applied to the DMRS may be signaled by a base station through a higher layer signal or a physical layer signal. Or, according to an embodiment of the present disclosure, the processor is configured to receive a user input to switch the drive mode from an autonomous mode to a manual mode, or to switch from a manual mode to an autonomous mode.

Advantageous Effects

According to the present disclosure, one specific sidelink signal may be selected from among a plurality of sidelink signals obtained by applying a plurality of scrambling codes to a demodulation reference signal (DMRS) and data symbols and then transmitted, thereby minimizing the peak-to-average power ratio/cubic metric (PAPR/CM) due to frequency-division multiplexing (FDM) of the DMRS and data symbols.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings:

FIG. 5 is a view illustrating the configuration of a wireless communication system having multiple antennas;

FIG. 8 is a view illustrating an exemplary D2D resource pool for D2D communication;

FIG. 9 is a view referred to for describing transmission modes and scheduling schemes for vehicle-to-everything (V2X);

FIG. 12 is a view referred to for describing an SA and data transmission in V2X;

FIGS. 13 and 14 is a view illustrating a new radio access technology (NRAT) frame structure;

BEST MODE

Figure 1:
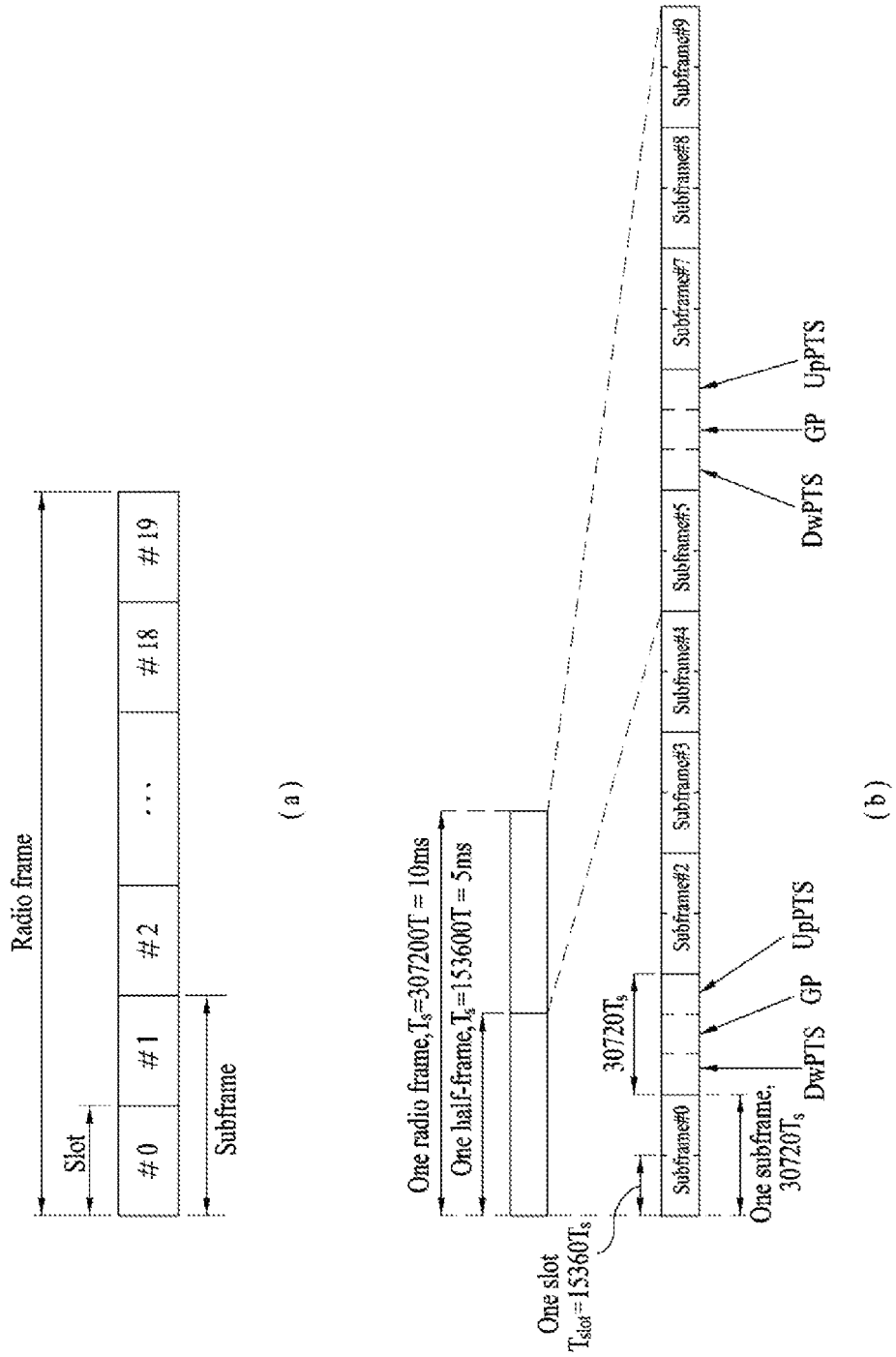
FIG. 1 is a view illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS), subscriber station (SS)', etc.

The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure can be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure can be supported by those documents. Further, all terms as set forth herein can be explained by the standard documents.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency-division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
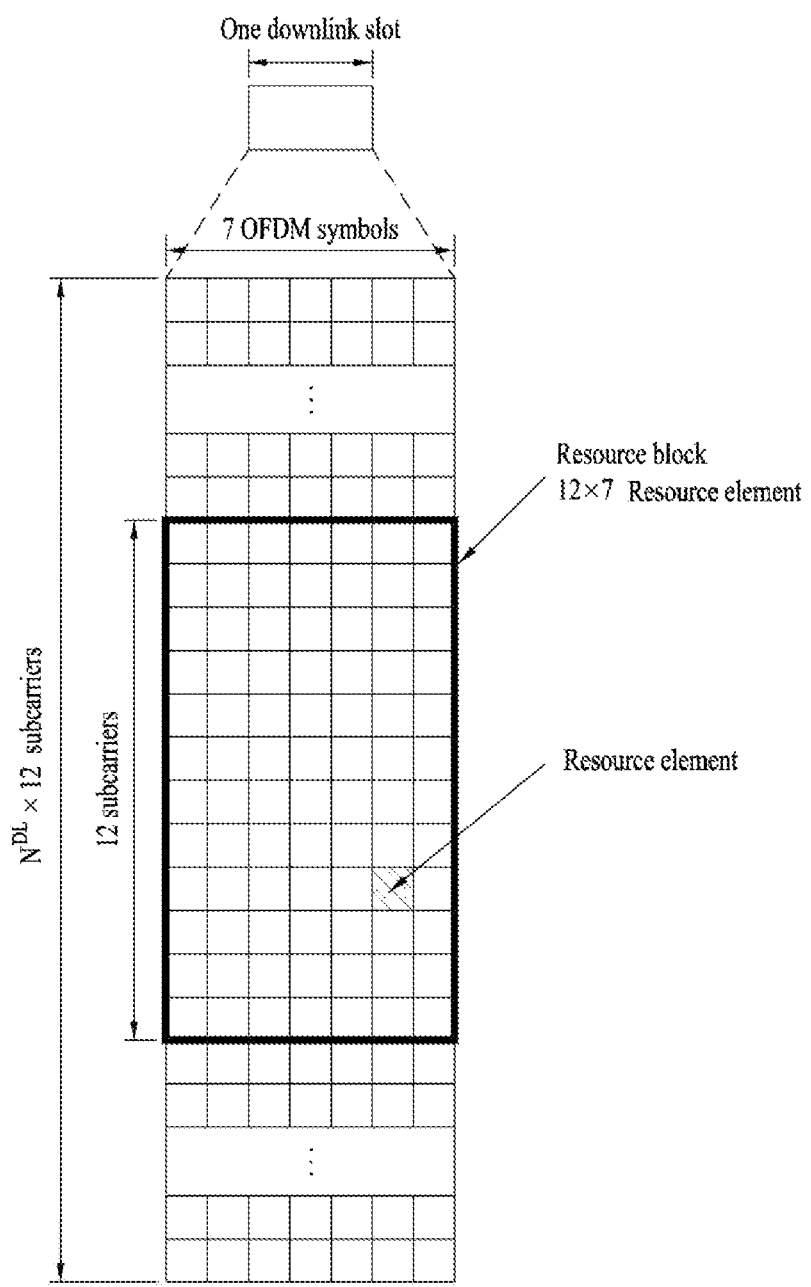
FIG. 2 is a view illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
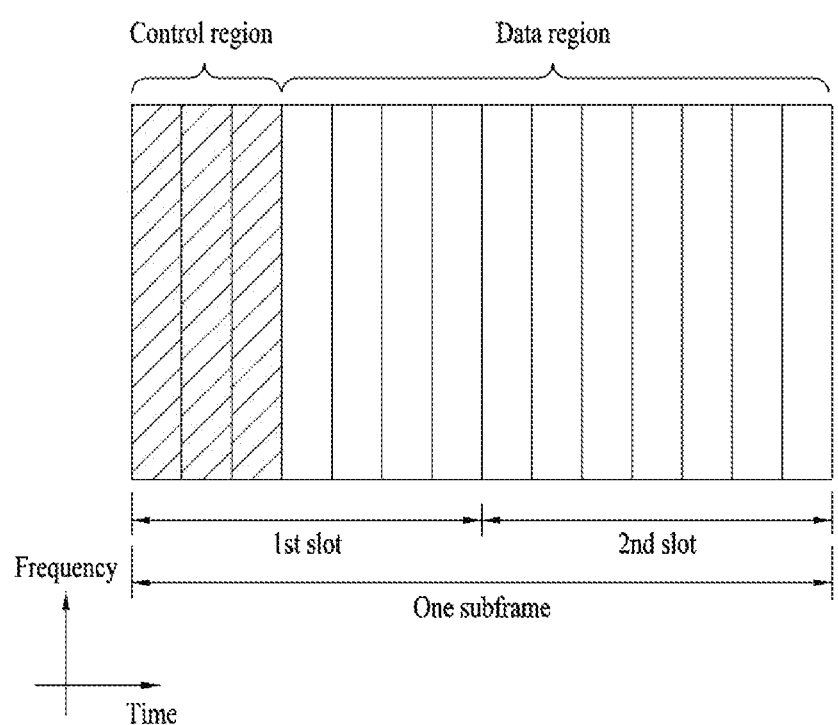
FIG. 3 is a view illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
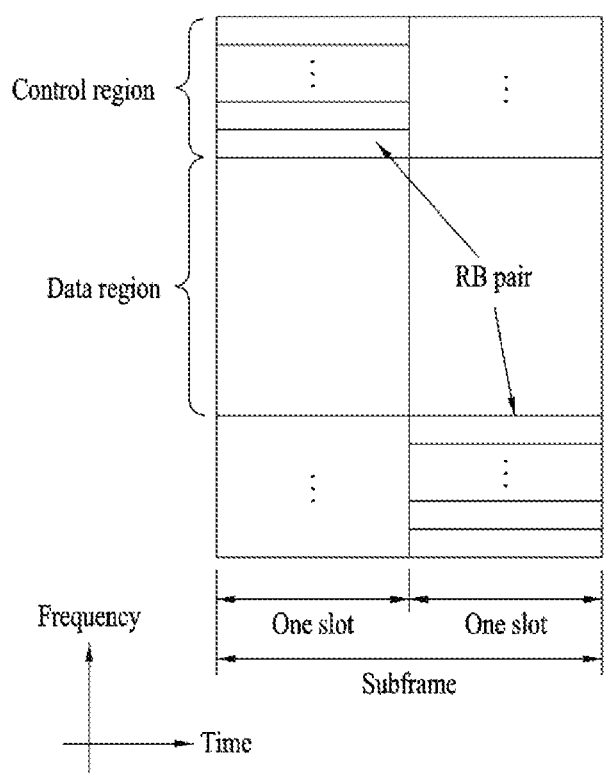
FIG. 4 is a view illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:

i) Demodulation-reference signal (DM-RS) used for channel estimation for coherent demodulation of information delivered on a PUSCH and a PUCCH; and ii) Sounding reference signal (SRS) used for an eNB or a network to measure the quality of an uplink channel in a different frequency.

The downlink RSs are categorized into:

i) Cell-specific reference signal (CRS) shared among all UEs of a cell;

ii) UE-specific RS dedicated to a specific UE;

iii) DM-RS used for coherent demodulation of a PDSCH, when the PDSCH is transmitted;

iv) Channel state information-reference signal (CSI-RS) carrying CSI, when downlink DM-RSs are transmitted;

v) Multimedia broadcast single frequency network (MBSFN) RS used for coherent demodulation of a signal transmitted in MBSFN mode; and vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of Multiple-Input Multiple-Output (MIMO) System

FIG. 5 is a diagram illustrating a configuration of a wireless communication system having multiple antennas.

As shown in FIG. 5(a), if the number of Tx antennas is increased to $N_T$ and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system can be obtained. Since this theoretical capacity increase of the MIMO system has been proved in the middle of 1990s, many ongoing efforts are made to various techniques to substantially improve a data transmission rate. In addition, these techniques are already adopted in part as standards for various wireless communications such as 3G mobile communication, next generation wireless LAN, and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ Tx antennas and $N_R$ Rx antennas.

Regarding a transmitted signal, if there are $N_T$ Tx antennas, the maximum number of pieces of information that can be transmitted is $N_T$. Hence, the transmission information can be represented as shown in Equation 2.

$$s = [s_1, s_2, \ldots, s_{N_T}]  \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i can be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting inter-cell interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a synchronization reference node (SRN, also referred to as a synchronization source)) may transmit a D2D synchronization signal (D2DSS) and the remaining UEs may transmit and receive signals in synchronization with the D2DSS.

Figure 6:
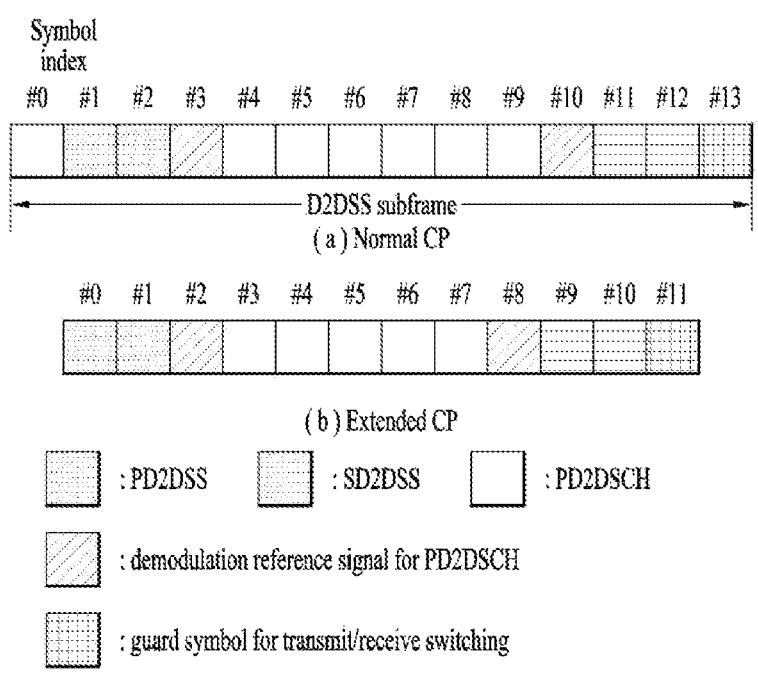
FIG. 6 is a view illustrating a subframe carrying a device-to-device (D2D) synchronization signal.

D2DSSs may include a primary D2DSS (PD2DSS) or a primary sidelink synchronization signal (PSSS) and a secondary D2DSS (SD2DSS) or a secondary sidelink synchronization signal (SSSS). The PD2DSS may be configured to have a similar/modified/repeated structure of a Zadoff-chu sequence of a predetermined length or a primary synchronization signal (PSS). Unlike a downlink (DL) primary synchronization signal (PSS), the PD2DSS may use a different Zadoff-Chu root index (e.g., 26, 37). And, the SD2DSS may be configured to have a similar/modified/repeated structure of an M-sequence or a secondary synchronization signal (SSS). If UEs synchronize their timing with an eNB, the eNB serves as an SRN and the D2DSS is a PSS/SSS. Unlike the DL PSS/SSS (secondary synchronization signal), the PD2DSS/SD2DSS follows an uplink (UL) subcarrier mapping scheme. FIG. 6 shows a subframe in which a D2D synchronization signal is transmitted. A physical D2D synchronization channel (PD2DSCH) may be a (broadcast) channel carrying basic (system) information that a UE should first obtain before D2D signal transmission and reception (e.g., D2DSS-related information, a duplex mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
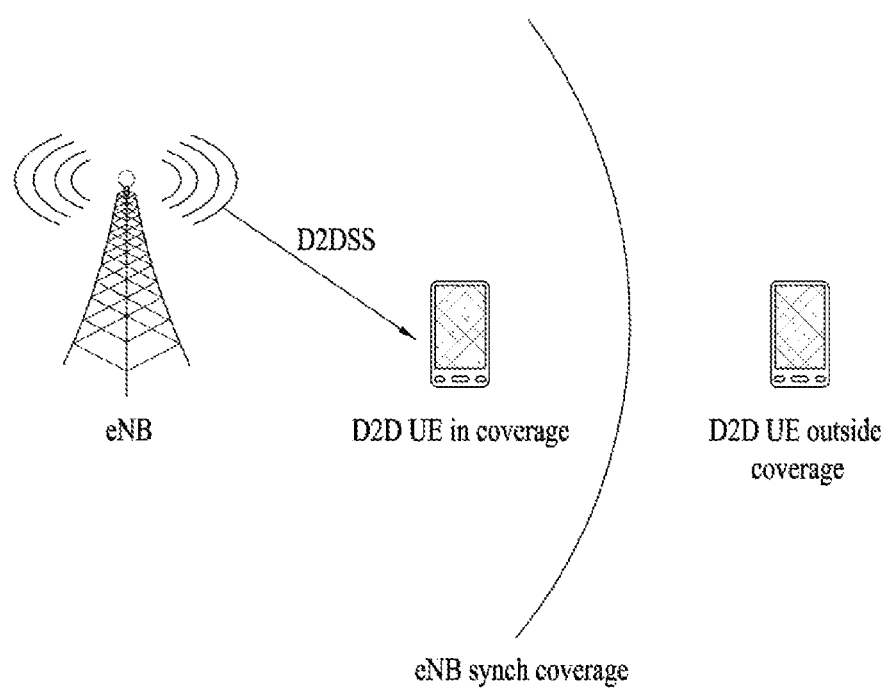
FIG. 7 is a view illustrating relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct amplify-and-forward (AF)-relay of an SS transmitted by an eNB. As the D2DSS is relayed, an in-coverage UE may communicate directly with an out-of-coverage UE.

D2D Resource Pool

FIG. 8 shows an example of a first UE (UE1), a second UE (UE2) and a resource pool used by UE1 and UE2 performing D2D communication. In FIG. 8(*a*), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. UE2 corresponding to a receiving UE receives a configuration of a resource pool in which UE1 is able to transmit a signal and detects a signal of UE1 in the resource pool. In this case, if UE1 is located at the inside of coverage of an eNB, the eNB can inform UE1 of the resource pool. If UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8(*b*) shows an example of configuring a resource unit. Referring to FIG. 8(*b*), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include a scheduling assignment (SA or physical sidelink control channel (PSCCH)), a D2D data channel, and a discovery channel. The SA may correspond to a signal including information on a resource position of a D2D data channel, information on a modulation and coding scheme (MCS) necessary for modulating and demodulating a data channel, information on a MIMO transmission scheme, information on a timing advance (TA), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a physical sidelink control channel (PSCCH). The D2D data channel (or, physical sidelink shared channel (PSSCH)) corresponds to a resource pool used by a transmitting UE to transmit user data. If an SA and a D2D data are transmitted in a manner of being multiplexed in an identical resource unit, D2D data channel except SA information can be transmitted only in a resource pool for the D2D data channel. In other word, REs, which are used to transmit SA information in a specific resource unit of an SA resource pool, can also be used for transmitting D2D data in a D2D data channel resource pool. The discovery channel may correspond to a resource pool for a message that enables a neighboring UE to discover transmitting UE transmitting information such as ID of the UE, and the like.

Despite the same contents, D2D signals may use different resource pools according to the transmission and reception properties of the D2D signals. For example, despite the same D2D data channels or the same discovery messages, they may be distinguished by different resource pools according to transmission timing determination schemes for the D2D signals (e.g., whether a D2D signal is transmitted at the reception time of a synchronization reference signal or at a time resulting from applying a predetermined TA to the reception time of the synchronization reference signal), resource allocation schemes for the D2D signals (e.g., whether an eNB configures the transmission resources of an individual signal for an individual transmitting UE or the individual transmitting UE autonomously selects the transmission resources of an individual signal in a pool), the signal formats of the D2D signals (e.g., the number of symbols occupied by each D2D signal in one subframe or the number of subframes used for transmission of a D2D signal), signal strengths from the eNB, the transmission power of a D2D UE, and so on. In D2D communication, a mode in which an eNB directly indicates transmission resources to a D2D transmitting UE is referred to as sidelink transmission mode 1, and a mode in which a transmission resource area is preconfigured or the eNB configures a transmission resource area and the UE directly selects transmission resources is referred to as sidelink transmission mode 2. In D2D discovery, a mode in which an eNB directly indicates resources is referred to as Type 2, and a mode in which a UE selects transmission resources directly from a preconfigured resource area or a resource area indicated by the eNB is referred to as Type 1.

Figure 10:
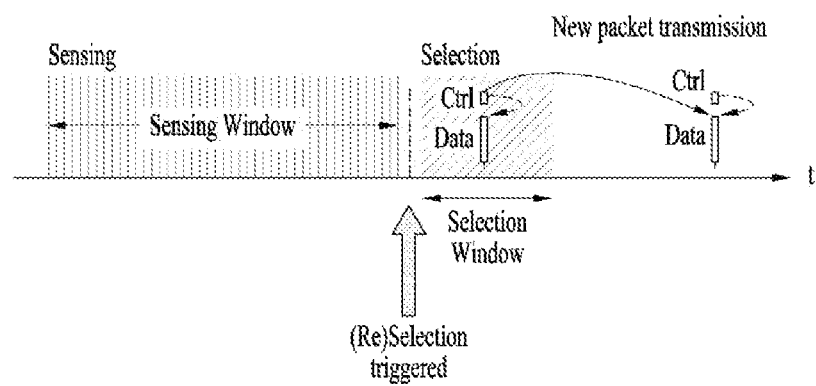
FIG. 10 is a view illustrating a method of selecting resources in V2X.
Figure 11:
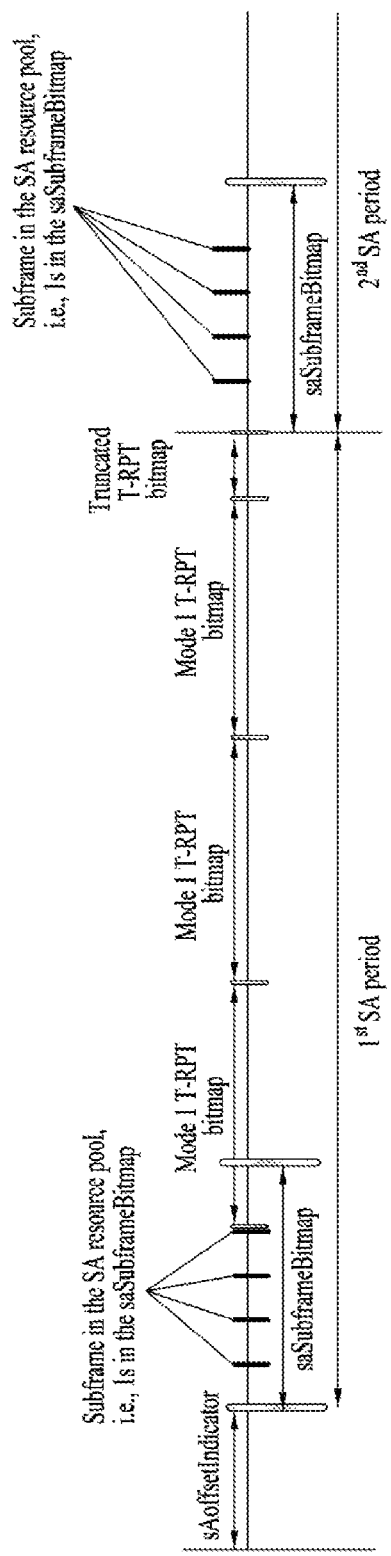
FIG. 11 is a view referred to for describing a scheduling assignment (SA) and data transmission in D2D.

In V2X, sidelink transmission mode 3 based on centralized scheduling and sidelink transmission mode 4 based on distributed scheduling are available. FIG. 9 illustrates scheduling schemes according to these two transmission modes. Referring to FIG. 9, in transmission mode 3 based on centralized scheduling, when a vehicle requests sidelink resources to an eNB (S901*a*), the eNB allocates the resources (S902*a*), and the vehicle transmits a signal in the resources to another vehicle (S903*a*). In the centralized transmission scheme, resources of another carrier may be also scheduled. In distributed scheduling corresponding to transmission mode 4 illustrated in FIG. 9(*b*), a vehicle selects transmission resources (S902*b*), while sensing resources preconfigured by the eNB, that is, a resource pool (S901*b*), and then transmits a signal in the selected resources to another vehicle (S903*b*). When the transmission resources are selected, transmission resources for a next packet are also reserved, as illustrated in FIG. 10. In V2X, each MAC PDU is transmitted twice. When resources for an initial transmission are reserved, resources for a retransmission are also reserved with a time gap from the resources for the initial transmission. For details of the resource reservation, see Section 14 of 3GPP TS 36.213 V14.6.0, which is incorporated herein as background art.

Transmission and Reception of SA

A UE in sidelink transmission mode 1 may transmit a scheduling assignment (SA) (a D2D signal or sidelink control information (SCI)) in resources configured by an eNB. A UE in sidelink transmission mode 2 may be configured with resources for D2D transmission by the eNB, select time and frequency resources from among the configured resources, and transmit an SA in the selected time and frequency resources.

In sidelink transmission mode 1 or 2, an SA period may be defined as illustrated in FIG. 9. Referring to FIG. 9, a first SA period may start in a subframe spaced from a specific system frame by a specific offset, SAOffsetIndicator indicated by higher-layer signaling. Each SA period may include an SA resource pool and a subframe pool for D2D data transmission. The SA resource pool may include the first subframe of the SA period to the last of subframes indicated as carrying an SA by a subframe bitmap, saSubframeBitmap. The resource pool for D2D data transmission may include subframes determined by a time-resource pattern for transmission (T-RPT) (or a time-resource pattern (TRP)) in mode 1. As illustrated, when the number of subframes included in the SA period except for the SA resource pool is larger than the number of T-RPT bits, the T-RPT may be applied repeatedly, and the last applied T-RPT may be truncated to include as many bits as the number of the remaining subframes. A transmitting UE performs transmission at T-RPT positions corresponding to is in a T-RPT bitmap, and one MAC PDU is transmitted four times.

Unlike D2D, an SA (PSCCH) and data (PSSCH) are frequency-division multiplexed (FDM) and transmitted in V2X, that is, sidelink transmission mode 3 or 4. Because latency reduction is a significant factor in V2X in view of the nature of vehicle communication, an SA and data are FDM and transmitted on different frequency resources of the same time resources. Examples of this transmission scheme are illustrated in FIG. 12. An SA and data may not be contiguous to each other as illustrated in FIG. 12(*a*) or may be contiguous to each other as illustrated in FIG. 12(*b*). Herein, a basic transmission unit is a subchannel. A subchannel is a resource unit including one or more RBs on the frequency axis in predetermined time resources (e.g., a subframe). The number of RBs included in a subchannel, that is, the size of the subchannel and the starting position of the subchannel on the frequency axis are indicated by higher-layer signaling.

In V2V communication, a cooperative awareness message (CAM) of a periodic message type, a decentralized environmental notification message (DENM) of an event triggered message type, and so on may be transmitted. The CAM may deliver basic vehicle information including dynamic state information about a vehicle, such as a direction and a speed, static data of the vehicle, such as dimensions, an ambient illumination state, details of a path, and so on. The CAM may be 50 bytes to 300 bytes in length. The CAM is broadcast, and its latency should be shorter than 100 ms. The DENM may be generated, upon occurrence of an unexpected incident such as breakdown or an accident of a vehicle. The DENM may be shorter than 3000 bytes, and received by all vehicles within a transmission range. The DENM may have a higher priority than the CAM. When it is said that a message has a higher priority, this may mean that from the perspective of one UE, in the case of simultaneous transmission of messages, the higher-priority message is transmitted above all things, or earlier in time than any other of the plurality of messages. From the perspective of multiple UEs, a message having a higher priority may be subjected to less interference than a message having a lower priority, to thereby have a reduced reception error probability. Regarding the CAM, the CAM may have a larger message size when it includes security overhead than when it does not.

New Radio Access Technology (New RAT or NR)

As more and more communication devices require a larger communication capacity, there is a need for enhanced mobile broadband communication beyond legacy RAT. In addition, massive Machine Type Communications (MTC)

capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and ultra-reliable and low latency communication (URLLC) is being discussed. In the present disclosure, for simplicity, this technology will be referred to as NR.

Figure 13:
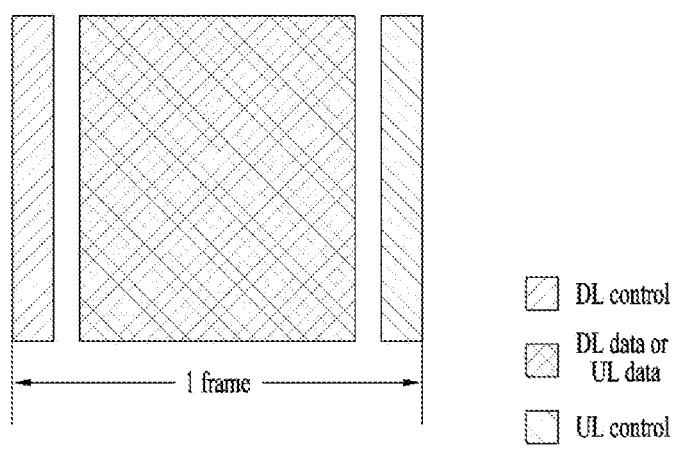

FIGS. 13 and 14 illustrate an exemplary frame structure available for NR. Referring to FIG. 13, the frame structure is characterized by a self-contained structure in which all of a DL control channel, DL or UL data, and a UL control channel are included in one frame. The DL control channel may deliver DL data scheduling information, UL data scheduling information, and so on, and the UL control channel may deliver ACK/NACK information for DL data, CSI (modulation and coding scheme (MCS) information, MIMO transmission-related information, and so on), a scheduling request, and so on. A time gap for DL-to-UL or UL-to-DL switching may be defined between a control region and the data region. A part of a DL control channel, DL data, UL data, and a UL control channel may not be configured in one frame. Further, the sequence of channels in one frame may be changed (e.g., DL control/DL data/UL control/UL data, UL control/UL data/DL control/DL data, or the like).

Meanwhile, carrier aggregation may be applied to D2D communication to improve data transfer rates or reliability. For example, upon receiving signals on aggregated carriers, a receiving UE may perform combining or joint-decoding thereon or forward decoded signals to higher layers so as to perform (soft) combining on the signals which are transmitted on the different carriers. For such operation, the receiving UE needs to know which carriers are aggregated, that is, which signals on which carriers the receiving UE needs to combine. Accordingly, the radio resources on the aggregated carriers needs to be informed. In 3GPP 14 V2X, a transmitting UE directly indicates the location of a time-frequency resource for transmitting data (PSSCH) using a control signal (PSCCH). If the carrier aggregation is indicated by the PSCCH, an additional bit field may be required for the indication. However, the remaining reserved bits of the PSCCH are about 5 to 7 bits, and these bit are insufficient. Hence, a method capable of indicating radio resources on aggregated carriers is required, and details thereof will be described in the following.

Cubic Metric Mitigation for V2X Communication

Figure 15:
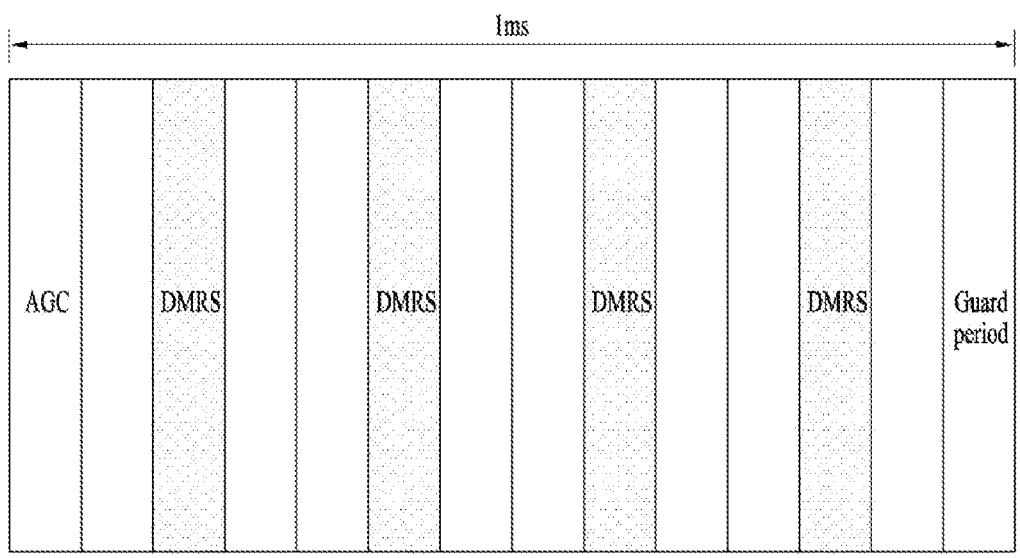
FIGS. 15 and 16 are diagrams for explaining demodulation reference signal (DMRS) structures used in sidelink communication.
Figure 16:
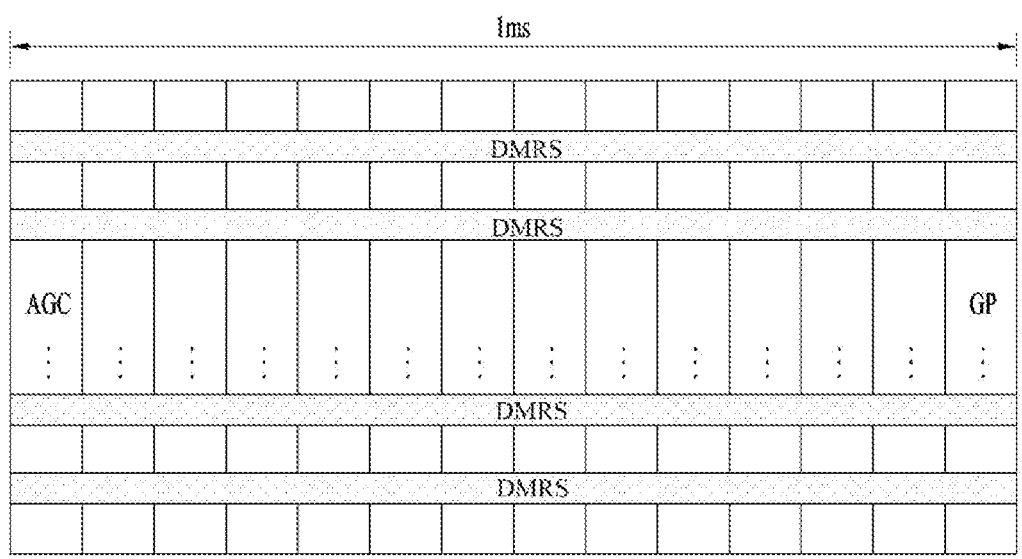

FIGS. 15 and 16 are diagrams for explaining DMRS structures used in sidelink communication.

Referring to FIG. 15, a four-vertical (4V) DMRS structure, which is obtained by adding two DMRSs to a PUSCH structure and locating the two DMRSs at the same interval, has been used in conventional Rel. 14 V2X to cover a relatively high speed (e.g., about 500 km/h). However, the DMRS structure shown in FIG. 15 has a disadvantage in that sidelink communication performance is degraded in a high-speed moving environment since a DMRS is not present in each symbol.

To solve the aforementioned problem, a two-horizontal (2H) DMRS per RB/subframe structure has been proposed (R1-155907, Ericsson). FIG. 16 shows an example of the 2H structure. In the 2H DMRS structure shown in FIG. 16, a DMRS sequence is located between discrete Fourier transform (DFT) precoded data symbols. In this case, the peak-to-average power ratio (PAPR) may increase due to frequency-division multiplexing (FDM) of a DFT precoded data signal and a DMRS.

Figure 17:
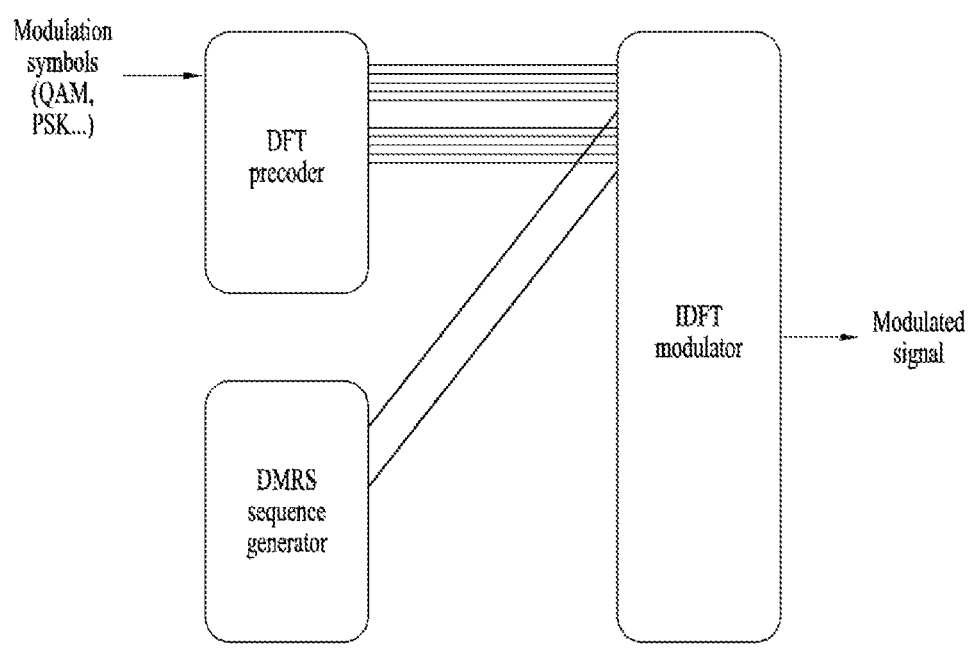
FIGS. 17 and 18 are block diagrams for explaining a method of generating a signal in a two-horizontal (2H) DMRS structure.
Figure 18:
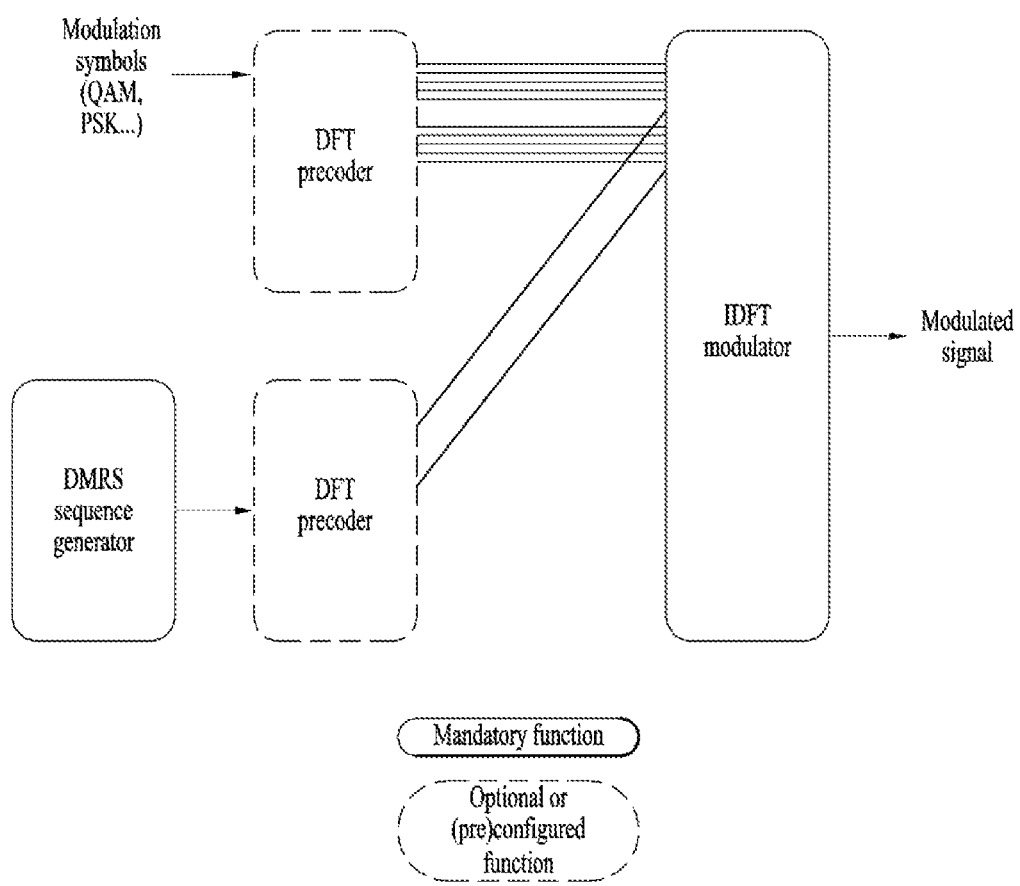

FIGS. 17 and 18 are block diagrams for explaining a method of generating a signal in a 2H DMRS structure.

The present disclosure proposes a method of reducing the cubic metric (CM) and/or PAPR in the 2H structure (or 2H DMRS structure). Although the present disclosure is described based on a structure where a DMRS is allocated to two subcarriers for each RB, the same principle is applicable to other embodiments with different distribution of subcarriers to which the DMRS is allocated.

The 2H DMRS structure may mitigate the PAPR by applying DFT precoding to a data signal (or symbol). In addition, the PAPR may be further mitigated when the DFT precoding is applied to a DMRS sequence. Even though the DMRS has no constant modulus property in the frequency domain, a receiver may perform frequency-domain channel estimation based on the DMRS of a received signal since the receiver knows which DMRS sequence is used to generate the DMRS of the received signal. When the DMRS is generated based on a Zadoff-Chu sequence, the DMRS may satisfy the constant modulus property after the DFT precoding. Thus, depending on the design of the DMRS, the shape of a signal may vary after the DFT precoding.

A transmitting UE may determine whether to apply the DFT precoding to the data or DMRS depending on the performance of a power amplifier (amp). For example, when the transmitting UE has a power amp with good performance, the transmitting UE may transmit an OFDM signal without applying the DFT precoding. On the contrary, when the transmitting UE has a power amp with poor performance, the transmitting UE may apply the DFT precoding to both the data and DMRS. In other words, when the power amp performance of the transmitting UE is capable of accommodating an increase in the PAPR, the DFT precoding may not be applied to the DMRS.

The transmitting UE may signal to a receiving UE that the transmitting UE applies DFT spreading to the data and/or DMRS through a physical layer or higher layer signal. Alternatively, a physical layer format used in a specific resource pool may be indicated by an eNB or network. For example, considering the point that the coverage of a signal is important in a freeway environment, the network or eNB may instruct the UE to transmit a signal by applying the DFT spreading to the data and/or DMRS in such a freeway environment. Alternatively, considering the point that in an urban environment, efficient channel estimation and interference are more important than coverage, the network or eNB may instruct the UE not to apply the DFT spreading to the DMRS through a physical layer and/or higher layer signal.

Whether the DFT precoding is applied to the data or DMRS may vary depending on the geographical location of the UE. For example, the network may instruct the UE to apply the DFT precoding to at least one of the data and DMRS in a specific area. Alternatively, the network may indicate in advance the application of the DFT precoding for each geographical area, and the UE may determine whether to apply the DFT precoding to at least one of the data and DMRS at a specific geographical location.

In the aforementioned methods, the application of the DFT precoding may be selectively determined based on the capability of the UE. In particular, a specific UE may not apply the DFT precoding to the DMRS at all times in order to prioritize the performance of DMRS channel estimation. In this case, the UE may selectively determine whether to apply the DFT precoding only to the data based on the geographical location of the UE or the instruction from the network/eNB.

Hereinabove, the methods of selectively determining whether the DFT precoding is applied when the data and DMRS are FDM have been described.

Figure 19:
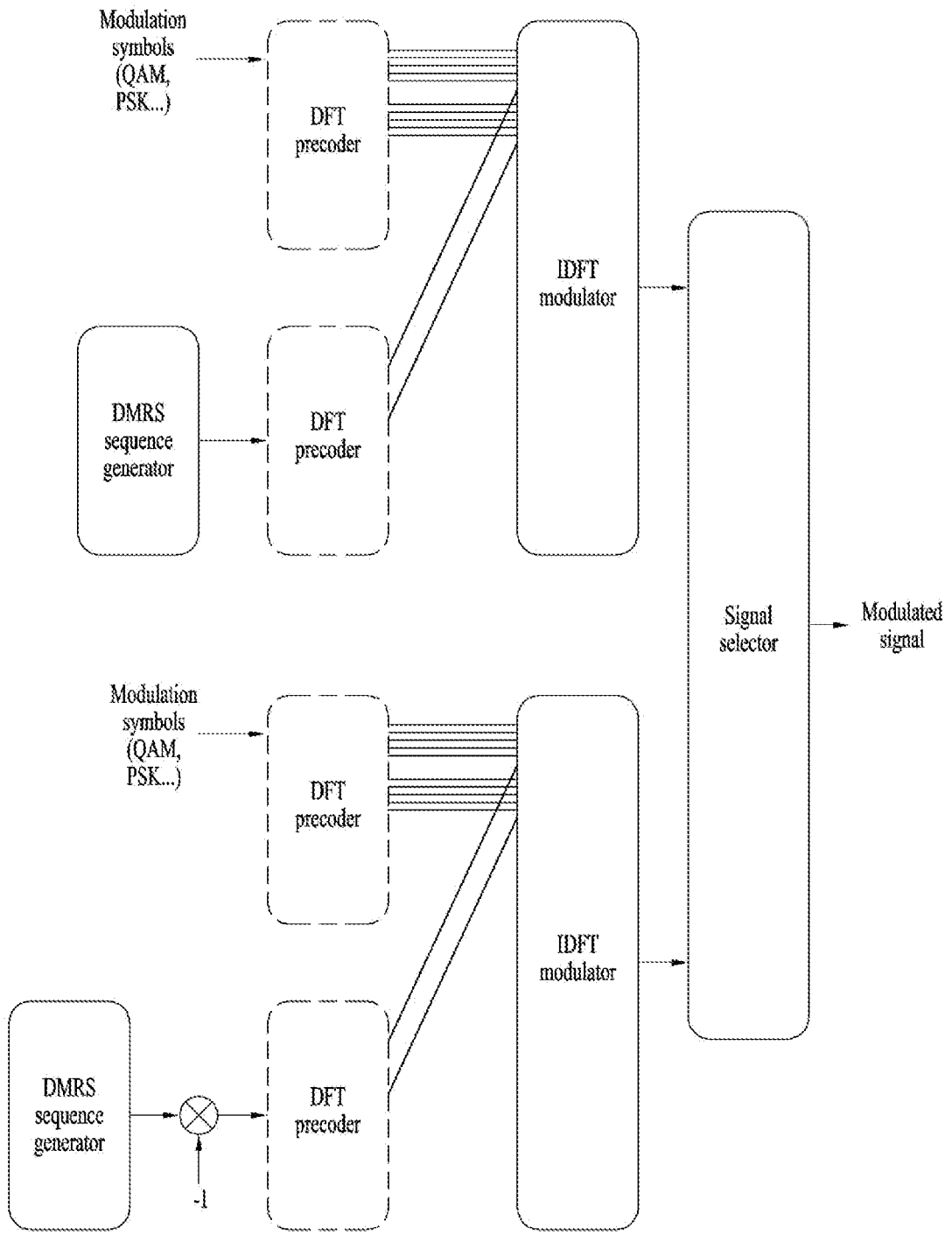
FIG. 19 is a block diagram for explaining a data and DMRS generation method according to an embodiment of the present disclosure.

FIG. 19 is a block diagram for explaining a data and DMRS generation method according to an embodiment of the present disclosure.

Referring to FIG. 19, when data is multiplexed with a DMRS in the frequency domain, the data and DMRS may be multiplied by different codes and then mapped. For example, the data may be always multiplied by a code of 1 (in this case, no operation is required), and the DMRS may be multiplied by a code of 1 or −1. As a result, the actual channels of the data and DMRS may be phase inverted by 180 degrees. This method may be interpreted to mean that the data and DMRS are multiplied by a length-2 scrambling code. In other words, as shown in FIG. 19, a length-2 code for multiplying a modulation symbol by a value for phase change may be applied to the data or DMRS. In this case, two different combinations of signals may be generated before an inverse fast Fourier transform (IFFT) is performed in the frequency domain, and after the IFFT is performed, a signal with a low PAPR/CM may be selected from among the two combinations of signals and then transmitted. By doing so, the PAPR/CM may be further mitigated. In this case, a transmitting UE may provide a receiving UE with one-bit scrambling code indication information for each symbol. Based on the scrambling code indication, the receiving UE may determine whether an estimated channel is phase inverted with respect to a data RE.

Although FIG. 19 shows that the DMRS is multiplied by −1 before DFT precoding, it is also allowed that the DMRS is multiplied by −1 after the DFT precoding. The reason for this is that scalar product before or after DFT operation causes no change in DFT operation results. In addition, FIG. 19 shows that the code with a phase difference of 0 and the code for generating a phase difference of 180 are applied to the DMRS and data, any other different length-2 codes capable of mitigating the PAPR/CM may be used.

Alternatively, a method of transmitting a signal with a low PAPR/CM by multiplying DMRS and data REs by different codes in multiple OFDM symbol groups may be applied. For example, the same code may be used in the multiple OFDM symbol groups. In this case, as the size of an OFDM symbol group increases, the PAPR/CM mitigation may slightly decrease but the number of indication bits may significantly decrease. Specifically, the same code may be applied to N OFDM symbol groups (or every N OFDM symbol groups), and in this case, the code may be a code for mitigating the maximum or average PAPR/CM in symbols of an OFDM symbol group.

Alternatively, when the transmitting UE may indicate a code used in the first OFDM symbol, the receiving UE may identify other codes through blind detection (BD). When the moving speed of the transmitting or receiving UE is less than or equal to a prescribed speed, a phase between adjacent symbols may not be changed up to 180 degrees. Thus, the receiving UE may identify a code applied after the first symbol by comparing a phase difference between the phase of the first symbol and the phase of the next symbol. Specifically, when the phase difference between the phase of the first symbol and the phase of the next symbol is more than or equal to a predetermined threshold, the receiving UE may determine that a different code is multiplied to the DMRS of the second symbol. By doing so, the receiving UE (or receiver) may identify a code applied to the DMRS of each symbol. Further, the transmitting UE may indicate only the codes of some symbols in one subframe, and the receiving UE may obtain scrambling codes applied to data or DMRSs of non-indicated symbols in the subframe through the BD. The transmitting UE may signal which code is applied to the data RE or DMRS for each symbol through a physical layer or higher layer signal. For example, some fields of a PSCCH may be allocated to transmit the corresponding information.

As an application of the aforementioned method, the transmitting UE may determine whether to indicate code information and which OFDM symbol the code information is for based on the moving speed of the UE. For example, when the speed is lower than X km/h, the transmitting UE may signal to the receiving UE the code information for each first slot (or symbol). When the speed is higher than X km/h, the UE may signal the code information for each symbol. The reason for this is that since the phase difference between symbols increases depending on the speed of the UE, the BD performance may be degraded.

Figure 20:
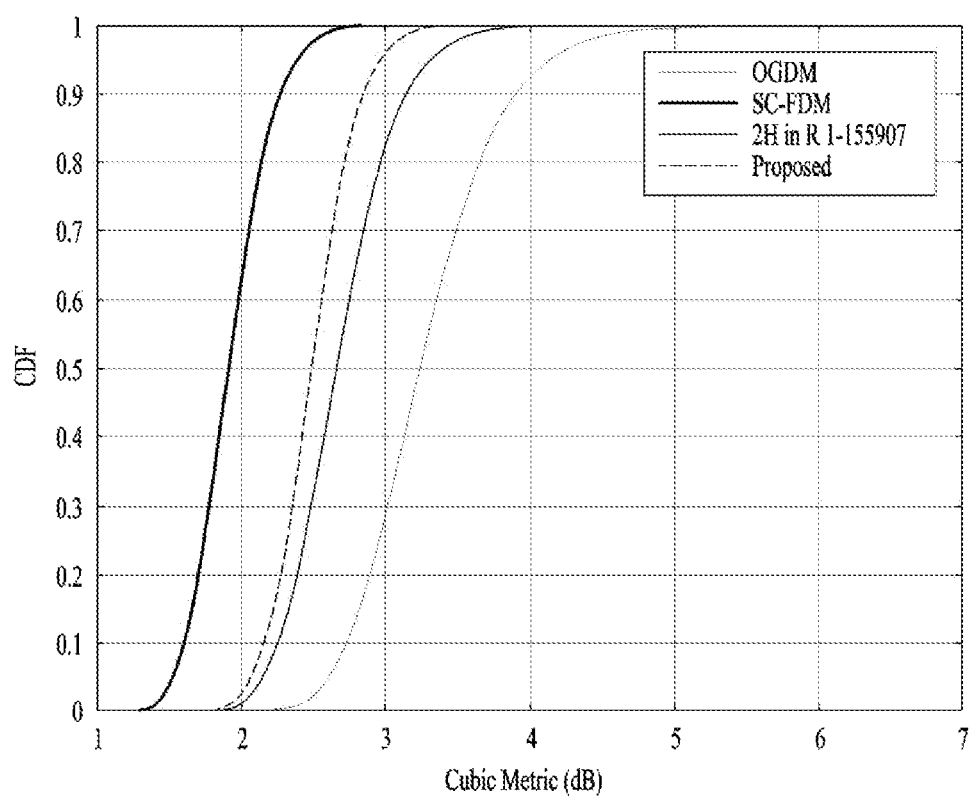
FIG. 20 is a diagram for explaining the mitigation effects of a cubic metric (CM) according to an embodiment of the present disclosure.

FIG. 20 is a diagram for explaining the mitigation effects of a CM according to an embodiment of the present disclosure.

In FIG. 20, it is assumed that a transmitting UE signals code information for each symbol to a receiving UE. In addition, DFT precoding is applied only to data except a DMRS. According to the proposed method, the CM is reduced by about 0.5 dB at a cumulative distribution function (CDF) point of 99%, compared to the conventional 2H structure.

The present disclosure is not limited to D2D communication. That is, the disclosure may be applied to UL or DL communication, and in this case, the proposed methods may be used by an eNB, a relay node, etc. Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from an eNB to a UE or from a transmitting UE to a receiving UE through a predefined signal (e.g., a physical layer signal, a higher layer signal, etc.).

Figure 21:
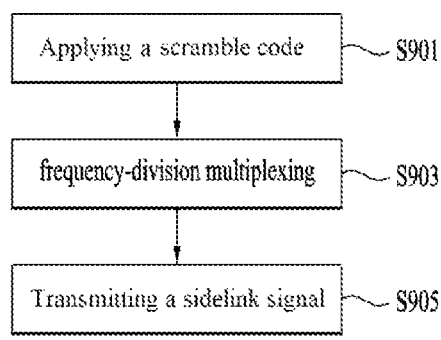
FIG. 21 is a diagram for explaining a method for a user equipment (UE) to transmit a sidelink signal where a data symbol and a DMRS are frequency-division multiplexed (FDM)

FIG. 21 is a diagram for explaining a method for a UE to transmit a sidelink signal where a data symbol and a DMRS are FDM.

As described above, when a UE transmits a sidelink signal through FDM of a data symbol and a DMRS, the PAPR for the sidelink signal may significantly increase. In other words, the PAPR may increase when the DMRS included in the sidelink signal is 1-DM with data symbols such that the DMRS is located between the data symbols as shown in FIG. 16. In this case, a scrambling code capable of reducing the PAPR/CM may be applied to the DMRS and data symbols as described above. Alternatively, DFT precoding may be applied to the DMRS. Hereinafter, a method of applying a scrambling code to a DMRS and data symbols will be described in detail.

Referring to FIG. 21, the UE may apply a specific code to the data symbol and DMRS (S901). The specific code may include a code for causing a change in the phase of at least one of the data symbol and DMRS. In other words, the specific code is a code for multiplying the data symbol or DMRS by a specific value, and the multiplication of the specific value may change the phase of the data symbol or DMRS. Hereinafter, a scrambling code is assumed to be the specific code. Alternatively, the DFT precoding may be applied to at least one of the data symbol and DMRS.

The scrambling code may be applied on an OFDM symbol group basis. In addition, the scrambling code may change a phase change value imposed on each OFDM symbol group. For example, first and second scrambling codes may be applied to first and second OFDM symbol groups, respectively, and the first and second scrambling codes may impose different phase values on the data symbol or DMRS.

Further, the scrambling code may not impose a phase change value on the data symbol but impose a phase change value on the DMRS only. Specifically, when the scrambling code is applied, the phase of the data symbol may not change but the phase of the DMRS may change. In this case, a scrambling code that does not change the phase of the DMRS may be applied to a specific OFDM symbol group, and a scrambling code that changes the phase of the DMRS may be applied to another OFDM symbol group.

The number of OFDM symbols in the OFDM symbol group may be determined according to the moving speed of the UE. When the moving speed of the UE is less than a prescribed speed, the OFDM symbol group may include at least two OFDM symbols. On the contrary, when the moving speed of the UE is more than or equal to the prescribed speed, the OFDM symbol group may consist of only one OFDM symbol.

The UE may apply a DFT to at least one of the data symbol and DMRS. That is, the UE may apply the DFT to the data symbol and also apply the DFT to the DMRS separately. For example, the UE may apply the DFT to the data symbol but may not apply the DFT to the DMRS. The UE may apply the DFT to the DMRS but may not apply the DFT to the data symbol. The UE may perform the DFT precoding on each of the DMRS and data symbol. When the DFT is applied to each of the data symbol and DMRS, the DFT precoding is applied to each of the data symbol and DMRS before the data symbol and DMRS are multiplexed.

Whether the DFT precoding is applied to the DMRS may be determined depending on the geographical location of the UE. Specifically, an eNB may configure in advance information about whether the DFT precoding is applied depending on the geographical location of the UE and then transmit the information to the UE. Based on the information, the UE may determine whether to apply the DFT precoding to the DMRS at the geographical location thereof. For example, the eNB may collect information on congestion levels or channel states in multiple areas. Based on the collected congestion levels or channel states in the multiple areas, the eNB may change whether the DFT precoding is applied to the DMRS for each area. Specifically, when the channel state or congestion level of a specific area is more than a specific threshold, the eNB may determine that accurate channel estimation is required based on the DMRS. In this case, the eNB may restrict the application of the DFT precoding to the DMRS for the specific area.

Alternatively, the UE may determine whether to apply the DFT precoding to the DMRS based a measured channel state or congestion level. For example, when the measured channel state or congestion level is less than a prescribed threshold, the UE may apply the DFT precoding to the DMRS. When the measured channel state or congestion level is equal to or more than the prescribed threshold, the UE may apply no DFT precoding to the DMRS. The prescribed threshold may be determined in advance in consideration of the relation between the required accuracy of DMRS-based channel estimation and the channel congestion level (or channel state).

Alternatively, the UE may determine whether to apply the DFT precoding to the DMRS in consideration of power amp performance. In other words, the UE may determine whether to apply the DFT precoding to the DMRS by considering the maximum transmit power, etc. For example, when the performance of the power amp is less than a prescribed value, the UE may apply the DFT precoding to the DMRS. The reason for this is that when the performance of the power amp is poor, PAPR mitigation required due to FUM of the data symbol and DMRS may be prioritized over accurate channel estimation based on the DMRS.

When the scrambling code and DFT precoding are applied to the data symbol and DMRS, the DFT precoding may be applied to the DMRS separately from the data symbol before the DMRS is multiplexed with the data symbol. That is, the DMRS may be multiplexed with the data symbol after the application of the DFT precoding. The application of the scrambling code may be performed before or after the application of the DFT precoding since the scrambling code is a scalar value that causes no effects on the DFT precoding.

Next, the UE may perform FDM on the data symbol and DMRS to which the scrambling code is applied. Specifically, the DMRS may be multiplexed in the frequency domain such that the DMRS is located between data symbols in the frequency domain. In this case, the application of the scrambling code may minimize the PAPR that depends on the FDM of the data symbol and DMRS as described above. Alternatively, the 2H DMRS structure may be used such that the DMRS is contiguously located over a plurality of symbols as shown in FIG. 16 (S903).

As shown in FIG. 19, two or more scrambling codes with different phase change values may be applied to one OFDM symbol group. In this case, two or more DMRSs with different phases may be generated for one OFDM symbol. The two or more DMRSs may be multiplexed with data symbols for the one OFDM symbol group so that two or more signals may be generated. In other words, when a plurality of scrambling codes are respectively applied to data symbols and DMRSs, a corresponding sidelink signal may be generated for each scrambling code. That is, when the plurality of scrambling codes are respectively applied to the data symbols and DMRSs, a sidelink signal corresponding to each scrambling code may be generated, and thus, a plurality of different sidelink signals corresponding to the data symbols and DMRSs may be generated. In this case, the UE may select and transmit only one sidelink signal. For example, the UE may measure the PAPR/CM for each of the plurality of sidelink signals and select and transmit a sidelink signal with the lowest measured PAPR/CM.

For example, the UE may generate a first sidelink signal by applying a first scrambling code to one OFDM symbol group and performing the DFT and FDM thereon. The UE may generate a second sidelink signal by applying a second scrambling code to the one OFDM symbol group and performing the DFT and FDM thereon. Then, the UE may select a signal with a low PAPR/CM from among the first and second sidelink signals and then transmit the selected signal as the sidelink signal for the one OFDM symbol group.

The UE may transmit a sidelink signal including the FDM data symbol and DMRS (S905).

As described above, the UE may generate the plurality of sidelink signals, each of which where the data symbol and DMRS are FDM, and select and transmit any one of the plurality of sidelink signals.

For example, the UE may signal indication information about the scrambling code. Specifically, the indication information may be transmitted through a physical layer or higher layer signal. When the sidelink signal is a sidelink data channel, the indication information may be transmitted on a sidelink control channel related to the data channel. The indication information includes information about the scrambling code applied to the data symbol and DMRS included in the sidelink signal. That is, upon receiving the sidelink signal, a receiving UE may identify the scrambling code applied to the data symbol and DMRS based on the indication information.

Alternatively, when the scrambling code is applied for each OFDM symbol group, the indication information may be signaled for each OFDM symbol group. In this case, since the indication information does not need to be transmitted in each OFDM symbol, the number of bits of the indication information for the sidelink signal may be reduced.

Alternatively, the UE may transmit the indication information by including information about a scrambling code applied to a specific OFDM symbol among a plurality of OFDM symbols included in a time unit in which the sidelink signal is transmitted. That is, even when scrambling codes are respectively applied to the plurality of OFDM symbols, the UE may provide only the information about the scrambling code for the specific OFDM symbol among the plurality of OFDM symbols to the receiving UE. The reason for this is that since the scrambling code changes the phase of the DMRS or data symbol, the receiving UE may blind detect scrambling codes applied to other OFDM symbols from phase differences from the other OFDM symbols based on the indication information. The specific symbol may be the first OFDM symbol among the plurality of OFDM symbols. Alternatively, the UE may signal in advance information about the size of the OFDM symbol group to which the scrambling code is applied.

Alternatively, when the scrambling codes are respectively applied the plurality of OFDM symbols, the UE may determine whether to transmit, as the indication information, only scrambling information applied to the specific OFDM symbol or all scrambling information applied to the OFDM symbols based on the moving speed of the UE. In other words, the UE may determine whether to signal, as the indication information, the scrambling information applied to the specific OFDM symbol or the indication information for each OFDM symbol by comparing the moving speed of the UE with a threshold speed. For example, when the moving speed of the UE is more than or equal to the predetermined threshold speed, the UE may signal the indication information for each OFDM symbol by considering the point that a phase variation per OFDM symbol increases due to the moving speed. When the moving speed of the UE is less than the predetermined threshold speed, the UE may signal to the receiving UE the indication information about the specific OFDM symbol among the plurality of OFDM symbols.

Alternatively, the UE may generate sidelink signals by applying different scrambling codes to the data symbol and DMRS. Specifically, the UE may generate a first sidelink signal by applying a first scrambling code to the data symbol and DMRS and generate a second sidelink signal by applying a second scrambling code, which is different from the first scrambling code, to the same data symbol and DMRS.

In this case, the UE may measure the PAPR of each of the first and second sidelink signals and select a sidelink signal with a lower PAPR among the first and second sidelink signals. Then, the UE may transmit the selected sidelink signal as the sidelink signal for the data symbol and DMRS.

Figure 22:
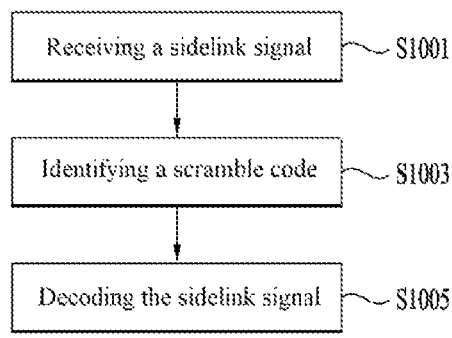
FIG. 22 is a diagram for explaining a method for a receiving UE to receive a sidelink signal where a data symbol and a DMRS are FDM.

FIG. 22 is a diagram for explaining a method for a receiving UE to receive a sidelink signal where a data symbol and a DMRS are FDM.

Referring to FIG. 22, the receiving UE may receive the sidelink signal where the data symbol and DMRS are FDM. In addition, the receiving UE may receive indication information about a scrambling code applied to the sidelink signal from a transmitting UE that transmits the sidelink signal through a physical layer or higher layer signal (S1001).

Next, the receiving UE may obtain the scrambling code applied to the data symbol and DMRS from the indication information on an OFDM symbol or OFDM symbol group basis. In other words, the receiving UE may obtain a phase change value imposed on the data symbol or DMRS for each OFDM symbol group from the indication information. The scrambling code may be applied on the OFDM symbol or OFDM symbol group basis, where an OFDM symbol group includes a plurality of OFDM symbols (S1003).

For convenience of description, it is assumed that a scrambling code is applied to each of a plurality of OFDM symbols included in a time unit in which the sidelink signal is transmitted.

For example, the receiving UE may obtain scrambling information applied to each of the plurality of OFDM symbols from the indication information. In this case, the receiving UE may obtain a phase change value imposed on at least one of the DMRS and data symbol based on the scrambling information. That is, the receiving UE may directly obtain the scrambling information applied to each of the plurality of OFDM symbols from the indication information which is transmitted from the transmitting UE through a physical layer or higher layer signal.

Alternatively, the receiving UE may receive indication information about only a specific OFDM symbol among the plurality of OFDM symbols. In this case, the receiving UE may obtain information about only a scrambling code applied to the specific OFDM symbol from the indication information. The receiving UE may compare a phase difference between the specific OFDM symbol and an adjacent OFDM symbol based on the scrambling code applied to the specific OFDM symbol and estimate a scrambling code applied to the adjacent OFDM symbol based on the phase difference. Specifically, the receiving UE may compare the phase difference between the specific OFDM symbol and adjacent OFDM symbol based on the scrambling code applied to the specific OFDM symbol. When the phase difference is more than or equal to a predetermined value, the receiving UE may know that the scrambling code applied to the adjacent OFDM symbol is different from that applied to the specific OFDM symbol. Information about scrambling codes applicable to the plurality of OFDM symbols may be shared between UEs in advance.

The receiving UE may receive information about the moving speed of the transmitting UE from the transmitting UE. Based on the moving speed of the transmitting UE, the receiving UE may know in advance whether indication information about each of the plurality of OFDM symbols is transmitted or only the indication information about the specific OFDM symbol among the plurality of OFDM symbols is transmitted. Specifically, the receiving UE may be provided in advance with the information about the moving speed of the transmitting UE. When the moving speed of the transmitting UE is more than or equal to a predetermined threshold speed, the receiving UE may expect that the indication information about each of the plurality of OFDM symbols will be transmitted. On the contrary, when the moving speed of the transmitting UE is less than the predetermined threshold speed, the receiving UE may expect that the indication information about the specific OFDM symbol among the plurality of OFDM symbols will be transmitted.

Next, the receiving UE may restore a data symbol or DMRS to which no scrambling code is applied based on the obtained or estimated scrambling code and perform decoding of the data symbol based on the restored DMRS (S1005).

Figure 23:
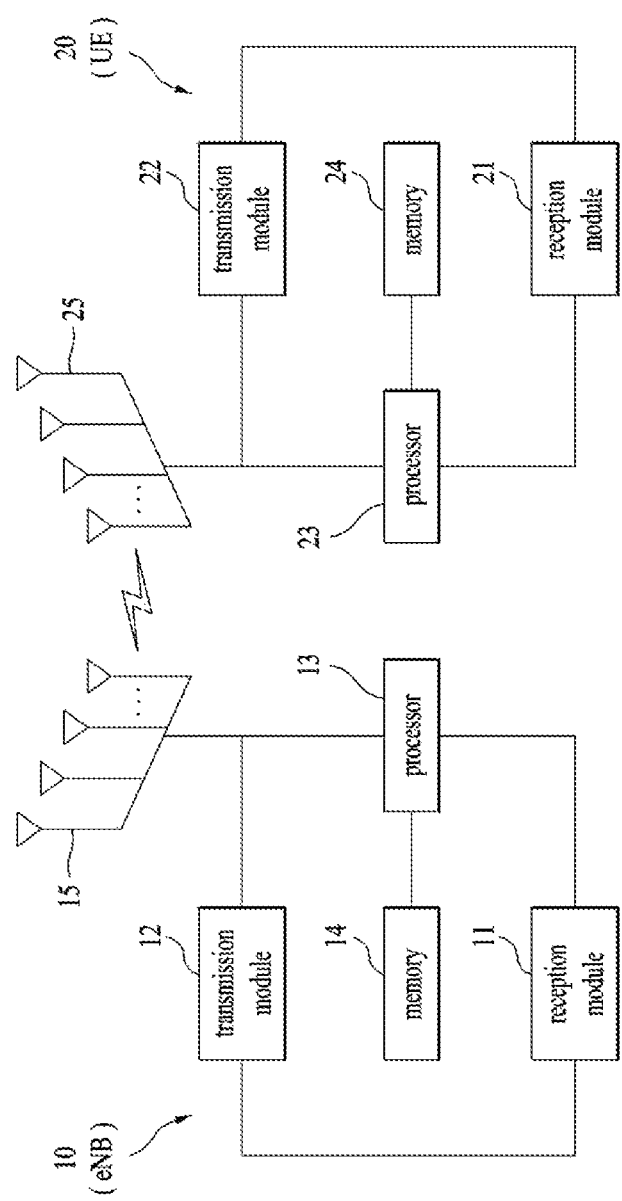
FIG. 23 is a block diagram illustrating wireless communication devices according to an embodiment of the present disclosure.

FIG. 23 is a diagram schematically illustrating a UE and an eNB for performing D2D communication according to the present disclosure.

Referring to FIG. 23, the UE 20 according to the present disclosure may include a receiving device (reception module) 21, a transmitting device (transmission module) 22, a processor 23, a memory 24, and a plurality of antennas 25. The plurality of antennas 25 means that the UE 20 supports MIMO transmission and reception. The receiving device 21 may be configured to receive various signals, data, and information from the eNB in DL. The transmitting device 22 may be configured to transmit various signals, data, and information to the eNB in UL. The processor 23 may be configured to control the overall operation of the UE 20.

The processor 23 of the UE 20 according to an embodiment of the present disclosure may be configured to process the operations required in the aforementioned embodiments.

Specifically, the processor 23 may be configured to apply a scrambling code to a DMRS and data symbols, which are delivered from the memory 24. The processor 23 may be configured to perform FDM on the DMRS and data symbols. The processor 23 may be configured to generate a sidelink signal including the FDM DMRS and data symbols and transmit the generated sidelink signal through the transmitting device 22. In this case, the transmitted sidelink signal is one sidelink signal selected from among a plurality of sidelink signals generated by applying a plurality of scrambling codes to the DMRS and data symbols.

The processor 23 may be configured to select and transmit one of the plurality of sidelink signals based on the PAPR.

The processor 23 may be configured to use as the scrambling code a code for imposing a phase change value to the DMRS or data symbols. The scrambling code may be applied for each predetermined OFDM symbol group. The processor 23 may be configured to determine the size of the predetermined OFDM symbol group based on the moving speed of the UE. When the moving speed of the UE is more than or equal to a prescribed speed, the processor 23 may be configured to set the predetermined OFDM symbol group with one OFDM symbol. Only when the moving speed of the UE is less than or equal to a prescribed threshold, the processor 23 may be configured to apply the scrambling code to the DMRS and data symbols.

The processor 23 may be configured to control the transmitting device 22 to signal indication information for identifying the scrambling code through a physical layer or higher layer signal. When a plurality of OFDM symbols are included in a time unit in which the sidelink signal is transmitted, the processor 23 may be configured to transmit the indication information by including only information about a scrambling code applied to a specific OFDM symbol among the plurality of OFDM symbols. The processor 23 may be determined the first OFDM symbol among the plurality of OFDM symbols as the specific symbol. When the plurality of OFDM symbols are included in the time unit in which the sidelink signal is transmitted, if the moving speed of the UE is more than or equal to a prescribed threshold speed, the processor 23 may be configured to signal the indication information for each OFDM symbol.

The processor 23 may be configured to apply DFT preceding to at least one of the DMRS and data symbols.

The processor 23 may be configured to select a sidelink signal with a low PAPR from among first and second sidelink signals and transmit the selected sidelink signal. In this case, the first sidelink signal may be obtained by applying a first scrambling code to the DMRS and data symbols, and the second sidelink signal may be obtained by applying a second scrambling code to the DMRS and data symbols.

The processor 23 may be configured to determine whether the DFT is applied to the DMRS based on the geographical location of the UE. The processor 23 may be configured to locate the DMRS between the data symbols in the frequency domain.

Further, the processor 23 of the UE 20 may be configured to perform a function of processing information received by the UE 20 or information to be transmitted by the UE 20 to the outside. The memory 24 may be configured to store the processed information for a predetermined time period, and the memory 24 may be replaced with a component such as a buffer (not shown in the drawing).

With continued reference to FIG. 23, the eNB 10 according to the present disclosure may include a receiving device (reception module) 11, a transmitting device (transmission module) 12, a processor 13, a memory 14, and a plurality of antennas 15. The plurality of antennas 15 means that the eNB 10 supports MIMO transmission and reception. The receiving device 11 may be configured to receive various signals, data, and information from the UE in UL. The transmitting device 12 may be configured to transmit various signals, data, and information to the UE in DL. The processor 13 may be configured to control the overall operation of the eNB 10.

The processor 13 of the eNB 10 according to an embodiment of the present disclosure may be configured to process the operations required in the aforementioned embodiments. Specifically, the processor 13 may be configured to control the transmitting device 12 to inform the UE 20 whether to apply DFT precoding to a DMRS. The processor 13 may be configured to determine whether the DFT precoding is applied to the DMRS in each geographical area. The processor 13 may be configured to determine or obtain in advance a channel state in each geographical area and determine whether the DFT precoding is applied to the DMRS in each geographical area based on the obtained channel state. For example, when the channel state is less than or equal to a prescribed threshold, the processor 13 may be configured to restrict the application of the DFT precoding to the DMRS. The processor 13 may be configured to transmit to the UE 20 information about whether the DFT precoding is applied to the DMRS in each geographical area.

The embodiments of the present disclosure may be implemented through various means, for example, in hardware, firmware, software, or a combination thereof.

In a hardware configuration, the methods according to the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The above-described embodiments of the present disclosure are applicable to various mobile communication systems.

The invention claimed is:

1. A method of transmitting a sidelink signal by a user equipment (UE) in a wireless communication system supporting sidelink, the method comprising:
generating sidelink signals, each including a demodulation reference signal (DMRS) and data modulation symbols; and
transmitting a sidelink signal selected from among the sidelink signals,
wherein the sidelink signals include a first sidelink signal to which a first scrambling code is applied to the data modulation symbols and the DMRS, and a second sidelink signal to which a second scrambling code is applied to the data modulation symbols and the DMRS,
wherein the data modulation symbols and the DMRS are frequency-division multiplexed (FDMed),
wherein the selected sidelink signal is a sidelink signal having a lower peak-to-average power ratio (PAPR) among the first sidelink signal and the second sidelink signal, and
wherein the first scrambling code is different from the second scrambling code.

2. The method of claim 1, wherein the first scrambling code or the second scrambling code includes a code for imposing a phase change value on the DMRS or the data modulation symbols.

3. The method of claim 2, wherein the first scrambling code and the second scrambling code are applied for each predetermined orthogonal frequency-division multiplexing (OFDM) symbol group.

4. The method of claim 3, wherein a size of the predetermined OFDM symbol group is determined based on a moving speed of the UE.

5. The method of claim 1, wherein the UE transmits indication information identifying the first scrambling code and the second scrambling code through a higher layer signal or a physical layer signal.

6. The method of claim 5, wherein the indication information indicates only a scrambling code related to a first orthogonal frequency-division multiplexing (OFDM) symbol among a plurality of OFDM symbols of a subframe in which the sidelink signal is transmitted, when a movement speed of the UE is less than a preconfigured threshold.

7. The method of claim 6, wherein when the movement speed of the UE is less than a preconfigured threshold, the indication information indicates the scrambling code related to each of the plurality of OFDM symbols.

8. The method of claim 1, further comprising:
applying discrete Fourier transform (DFT) preceding to at least one of the DMRS or the data modulation symbols.

9. The method of claim 8, wherein whether a DFT is applied to the DMRS is determined based on a geographical location of the UE.

10. The method of claim 1, wherein the DMRS is located between the data modulation symbols in a frequency domain.

11. The method of claim 8, wherein whether the DFT is applied to the DMRS is signaled by a base station through a higher layer signal or a physical layer signal.

12. A device for transmitting a sidelink signal in a wireless communication system supporting sidelink, the device comprising:
a processor; and
a memory operatively connected to the processor,
wherein the processor is configured to generate sidelink signals, each including a frequency-division multiplexed (FDM) demodulation reference signal (DMRS) and data modulation symbols, and transmit a sidelink signal selected from among the sidelink signals,
wherein the sidelink signals include a first sidelink signal to which a first scrambling code is applied to the data modulation symbols and the DMRS, and a second sidelink signal to which a second scrambling code is applied to the data modulation symbols and the DMRS,
wherein the data modulation symbols and the DMRS are frequency-division multiplexed (FDMed),
wherein the selected sidelink signal is a sidelink signal having a lower peak-to-average power ratio (PAPR) among the first sidelink signal and the second sidelink signal, and
wherein the first scrambling code is different from the second scrambling code.

13. The device of claim 12, wherein the processor is configured to receive a user input to switch a drive mode from an autonomous mode to a manual mode, or to switch from a manual mode to an autonomous mode.

* * * * *